United States Patent
Lang et al.

(10) Patent No.: US 8,666,852 B1
(45) Date of Patent: Mar. 4, 2014

(54) MASS REVERSAL OF DOCUMENTS BASED ON REVERSAL TASKS AND REVERSAL TRIGGERS

(71) Applicants: Georg Lang, Ludwigshafen (DE); Artur Kaufmann, Landau (DE)

(72) Inventors: Georg Lang, Ludwigshafen (DE); Artur Kaufmann, Landau (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/628,739

(22) Filed: Sep. 27, 2012

(51) Int. Cl.
*G07B 17/00* (2006.01)
*G07F 19/00* (2006.01)
*H04M 15/00* (2006.01)
*G06F 7/00* (2006.01)
*G06F 17/00* (2006.01)

(52) U.S. Cl.
USPC ............................... 705/30; 707/694; 705/34

(58) Field of Classification Search
USPC ....................................... 705/30, 34; 707/694
See application file for complete search history.

(56) References Cited

U.S. PATENT DOCUMENTS

| 7,778,982 B2* | 8/2010 | Baker .......................... 707/694 |
| 2006/0230311 A1* | 10/2006 | Kao et al. ........................ 714/16 |
| 2009/0024608 A1* | 1/2009 | Deolalikar ........................ 707/5 |
| 2010/0146385 A1* | 6/2010 | Goulandris ................... 715/255 |
| 2013/0046684 A1* | 2/2013 | Driemeyer et al. ............. 705/39 |

OTHER PUBLICATIONS

VAT: Reverse charge system may create red tape, study warns. Jan. 22, 2008. European Report, p. 217387.*

* cited by examiner

*Primary Examiner* — Scott Zare
(74) *Attorney, Agent, or Firm* — Schwegman Lundberg & Woessner, P.A.

(57) ABSTRACT

In an example embodiment, a mass reversal of documents in a convergent invoicing system may be accomplished by first receiving a first set of one or more reversal triggers, wherein each of the one or more task triggers corresponds to a document in the convergent invoicing system. Then a reversal task is received, wherein the reversal task corresponds to the first set of one or more reversal triggers. A second set of reversal triggers may then be automatically corresponded to the reversal task, based upon documents corresponding to the one or more task triggers in the first set of one or more reversal triggers. Once an indication that the reversal task has been released is received, for each reversal trigger corresponding to the reversal task, the reversal trigger is processed, causing a corresponding document to be reversed.

14 Claims, 17 Drawing Sheets

| Reversal Task Administrative Record (DFKKINV_REVT) | | | |
|---|---|---|---|
| Field | Key | Type | Description |
| MANDT | X | MANDT | |
| REVTASK | X | REVTASK_KK (CHAR12) | Reversal Task |
| REVTASK_DESC | | REVTASK_DESC_KK (CHAR60) | Description of Reversal Task |
| INCLUDE | | FKKINV_REVT_ADMIN | |
| CRNAME | | | Created by |
| CRDATE | | | Created on |
| CRTIME | | | Created at |
| CHNAME | | | Changed by |
| CHDATE | | | Changed on |
| CHTIME | | | Changed at |
| REVSTATUS | | REVSTATUS_KK (CHAR1) | SPACE = new (not saved on DB yet)<br>O = open (cannot be processed yet)<br>R = released (no new reversal triggers allowed; can be processed)<br>A = aborted (reversal task manually aborted during processing)<br>F = finished (completely processed)<br>X = rejected (cancelled prior to released) |
| XREVLOCKED | | XREVLOCKED_KK (CHAR1) | TRUE, FALSE<br>Record cannot be processed or used in new reversal triggers |
| LOEDT | | LOEDT_KK (DATS) | Date when this record can be deleted (implicitly delete during SELECT module if LOEDT <= SY-DATLO) |

*FIG. 6*

| Reversal Task Billing (DFKKINV_BILL_REVT) | | | |
|---|---|---|---|
| Field | Key | Type | Description |
| MANDT | X | MANDT | |
| REVTASK | X | REVTASK_KK (CHAR12) | Reversal Task |
| REVREASON | | BILL_REVREASON_KK | Reversal Reason |
| CNT_BILLDOC_TOTAL | | CNT_BILLDOC_TOTAL_KK (INT4) | # of single reversal triggers for REVRUN* |

FIG. 7

| Reversal Task Invoicing (DFKKI\_YDOC\_REVT) | | | |
|---|---|---|---|
| Field | Key | Type | Description |
| MANDT | X | MANDT | |
| REVTASK | X | REVTASK\_KK (CHAR12) | Reversal Task |
| REVREASON | | REVREASON\_KK | Reversal Reason |
| CNT\_INVDOC\_TOTAL | | INVDOC\_TOTAL\_KK (INT4) | # of single reversal triggers for REVRUN\* |

FIG. 8

Billing Reversal Triggers (DFKKINVBILL_REV) — 900, 902, 904

| Field | Key | Type | Description |
|---|---|---|---|
| MANDT | X | MANDT | |
| BILLDOCNO | X | BILLDOCNO_KK | Billing Document Number |
| REVTASK | X | REVTASK_KK (CHAR12) | |
| REVREASON | | BILL_REVREASON_KK | |
| SRCPROCESS | | | |
| BILLPROCESS | | | |
| GPART | | | |
| VKONT | S1 | | Secondary Index for Parallelization |
| .INCLUDE | | FKKINV_REV_ADMIN | |
| CRNAME | | | Created by |
| CRDATE | | | Created on |
| CRTIME | | | Created at |

*FIG. 9*

MASS REVERSAL OF DOCUMENTS BASED ON REVERSAL TASKS AND REVERSAL TRIGGERS

TECHNICAL FIELD

This document generally related to systems and methods for use with enterprise resource planning. More specifically, this document relates to methods and systems for performing a mass reversal of documents based on reversal tasks and reversal triggers.

BACKGROUND

Enterprise resource planning (ERP) systems allow for the integration of internal and external management information across an entire organization, including financial/accounting, manufacturing, sales and service, customer relationship management, and the like. The purpose of ERP is to facilitate the flow of information between business functions inside the organization and manage connections to outside entities. Convergent Invoicing (CI) integrated ERP and Customer Relationship Management (CRM) systems so that organizations with complex billing processes can create, change, and cancel billable accounts for customers, as well as retrieve and view invoicing data for services rendered on demand.

BRIEF DESCRIPTION OF DRAWINGS

The present disclosure is illustrated by way of examples and not limitation in the figures of the accompanying drawings, in which like references indicate similar elements and in which:

FIG. 6 is a diagram illustrating a reversal task administrative record, in accordance with an example embodiment.

FIG. 7 is a diagram illustrating a reversal task billing record, in accordance with an example embodiment.

FIG. 8 is a diagram illustrating a reversal task invoicing record, in accordance with an example embodiment.

FIG. 9 is a diagram illustrating a billing reversal trigger record, in accordance with an example embodiment.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instructions instances, protocols, structures, and techniques have not been shown in detail.

In an example embodiment, billing/invoicing documents within a convergent invoicing system can be reversed en masse, using reversal tasks and reversal triggers. This allows for an easy reversal of multiple documents. It also allows for a "chain" of documents (i.e., documents that are dependent on other documents to be reversed en masse), even if the user does not explicitly indicate that certain documents in the chain need to be reversed.

Figure 1:
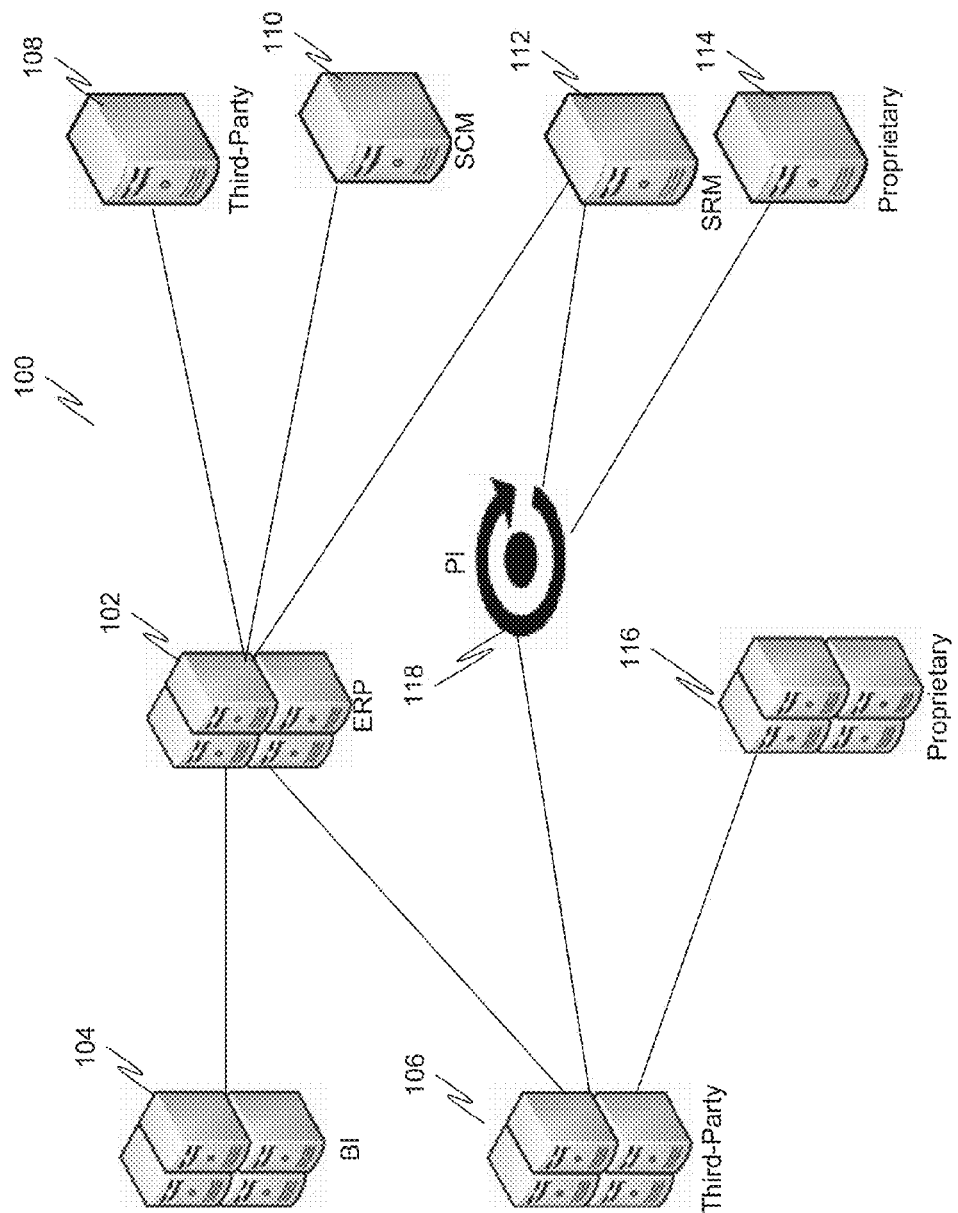
FIG. 1 depicts an application landscape, in accordance with an example embodiment.

FIG. 1 depicts an application landscape, in accordance with an example embodiment. The application landscape 100 comprises different heterogeneous software and/or hardware components 102 to 118, which are connected to each other as shown by the solid lines in FIG. 1, and which may operate together in the application landscape 100 to process, for example, a business scenario. The application landscape 100 may comprises an ERP 102. The ERP 102 may integrate internal and external management information across an entire organization, embracing different activities and/or services of an enterprise. ERP 102 automates the activities and/or services with an integrated computer-based application. An ERP 102 can run on a variety of hardware and/or network configurations, typically employing a database to store its data. The ERP 102 may be associated with (e.g., directly or indirectly connected to and/or in (networked) communication with) a business intelligence (BI) component 104, one or more third parties 106 and 108, a supply chain management (SCM) component 110, and/or a supplier relationship management (SRM) component 112. The SRM 112 and/or the SCM 110 may further be associated with at least one proprietary service 114. Furthermore, at least one of the third parties 106 may also be associated with at least one proprietary service 116. The BI component 104 may provide bistorical, current, and predictive views of business processes and/or business scenarios, for example, performed on the ERP 102. Common functionality of business intelligence technologies may comprise reporting, online analytical processing, analytics, data mining, business performance management, benchmarking, text mining, and/or predictive analytics. The functionality may be used to support better decision making in the ERP 102. The SCM component 110 may manage a network of interconnected businesses involved in the provision of product and/or service packages required by end consumers such as the ERP 102. The SCM component 110 may span movement and storage of raw materials, work-in-process inventory, and finished goods from point of origin to point of consumption (also referred to as a supply chain). The SRM component 112 may specify collaborations with suppliers that are vital to the success of the ERP 102 (e.g., to maximize the potential value of those relationships). All of those systems may be integrated via a process integration component 118.

Figure 2:
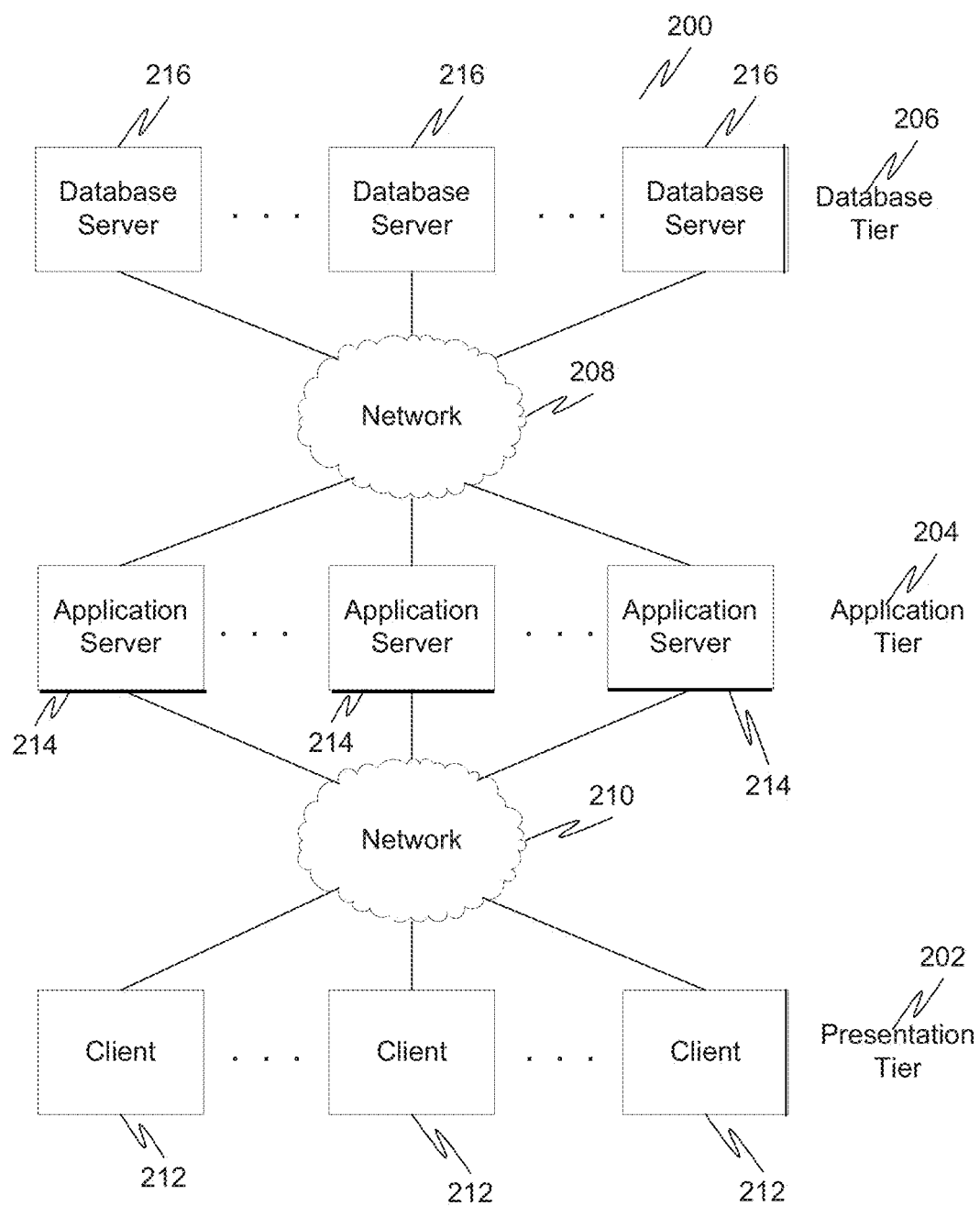
FIG. 2 is a block diagram of a three tier architecture system, in accordance with an example embodiment.

FIG. 2 is a block diagram of a three tier architecture system, in accordance with an example embodiment. The system 200 includes a presentation tier 202, an application tier 204, and a database tier 206. Networks 208, 210 connect the devices within and between the tiers. The networks 208, 210 may include one or more networks, such as a local area network (LAN), a wide area network (WAN), or the Internet.

The presentation tier 202 generally includes one or more client computers 212. The client computers 212 generally provide a graphical user interface for users to interact with the other parts of the system 200. The user interface may be implemented by a browser, for example as a Java application.

The application tier 204 generally includes one or more application servers 214. The application servers 214 generally implement the business logic for processing interactions between the users and the underlying data. This business logic is generally referred to as "the application" or "the application program." The application tier 204 may implement various applications to perform various functions, such as invoicing, inventory control, supply chain management, and the like. Various of the application servers 214 may perform different functions. For example, one of the application servers 214 may be used for prototyping or development, while the others may be used for business intelligence production activities.

The database tier 206 generally includes one or more database servers 216. The database servers 216 generally implement a database management system that stores and manipulates the underlying data and related metadata. This database management system is generally referred to as "the database," "the database system," or "the database program." The database servers 216 may implement various types of database systems, including DB2, Informix, MaxDB, Oracle and Microsoft SQL Server.

Although many separate devices are shown in each tier, this is mainly for illustration purposes to show scalability. For example, a single database server may be used in the basic configuration, but as the amount of data in the databases increases, the number of database servers 216 may be increased. As another example, a single application server may be used in the basic configuration, but as the amount of business logic processes increases, the number of application servers 214 may be increased.

The various devices in the various tiers may implement different operating systems. For example, a client computer 212 may run Microsoft Windows and an application server 214 may implement Linux. Note that various devices generally implement both an operating system program and another program, which are distinct. For example, a client computer 212 may implement Microsoft Windows (operating system) and Microsoft Internet Explorer (user interface program). An application server 214 may implement Linux (operating system) and an invoicing system (application program). A database server 216 may implement Linux (operating system) and Oracle database (database program).

The SAP Web Application Server is a specific example of an implementation of the application landscape 100. An example embodiment generally involves an application program and a database program, as detailed below.

Figure 3:
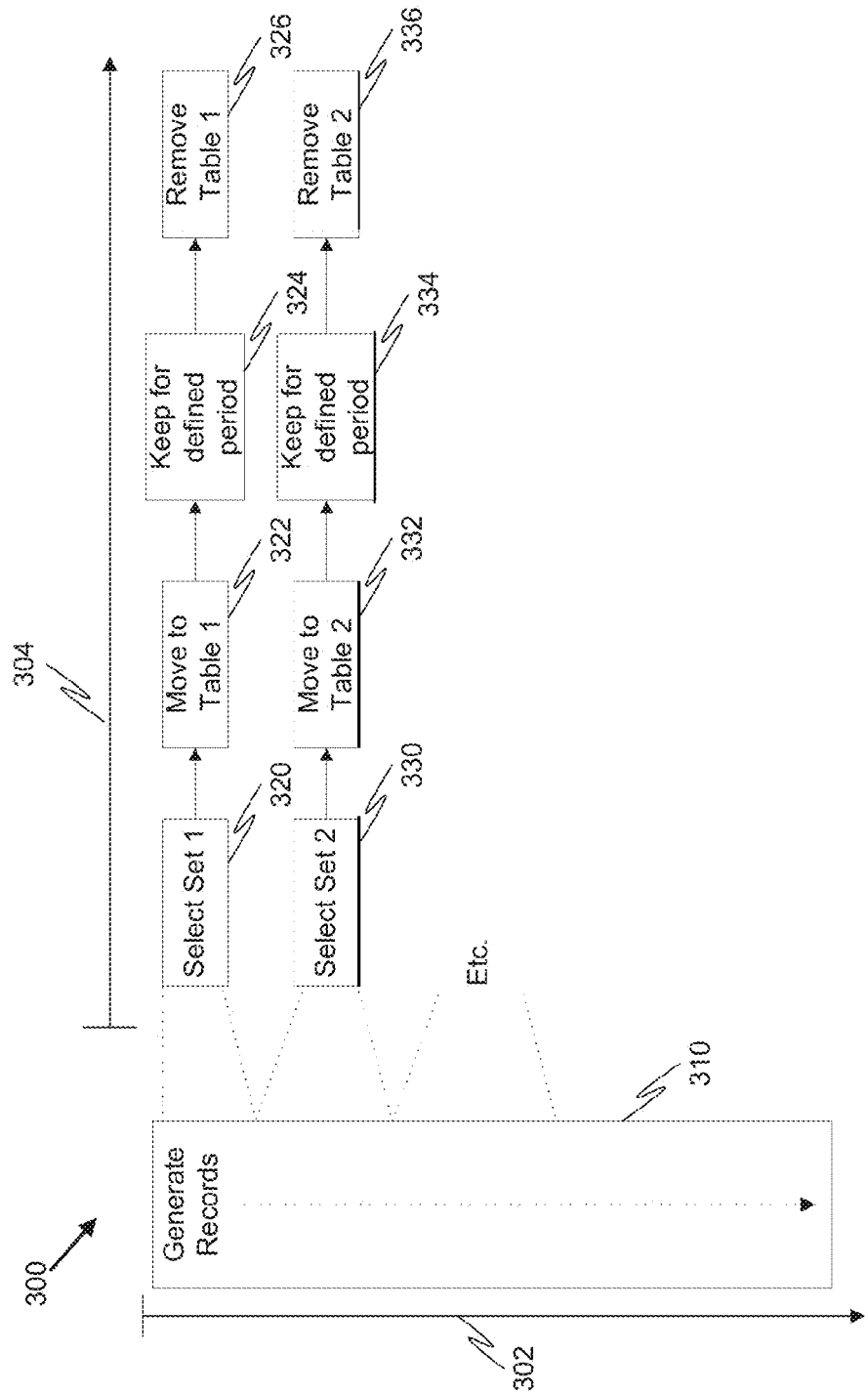
FIG. 3 is a diagram of a timeline that is used to illustrate an example embodiment of a convergent invoicing system.

FIG. 3 is a diagram of a timeline that is used to illustrate an example embodiment of a convergent invoicing system. The timeline 300 includes a y axis 302 and an x axis 304. The y axis 302 shows the flow of a generally continuous data generation process where records 310 are generated. (The term "record" generally refers to a line item in a database that includes one or more pieces of data; a record may also be referred to as a "transaction.") These records may be (for example) telephone call records, including information such as the calling number, the called number, the start time, the duration, the account number, the applicable tariff, the applicable tax, and the like. These records are being continuously generated by the application program (see the application server 214 in FIG. 2 and related description). In the context of a convergent invoicing system, "generated" also includes receiving records from other systems. For example, Company X may generate a record and send the record to Company Y, in which case Company Y generates a corresponding record in the records 310. The number of records in the records 310 may be very large (for example, 1,000,000 customers each receive an invoice with 100 to 1000 calls every month, times the number of months retained in the records 310). The records 310 may be stored in a table in a database (see the database server 216 in FIG. 2 and related description).

The x axis 304 shows the flow of data processing according to an example embodiment of a convergent invoicing system. At 320, for a given time period, a set of the records are selected from the records 310. The time period may be, for example, a month; and the records selected are those that are to be invoiced for that month. The application program (see the application server 214 in FIG. 2 and related description) may select the set.

In an example embodiment, the set is selected as part of another process that may already be occurring as part of the data processing operations of the system 200 (see FIG. 2). For example, an invoicing process may already be occurring as one of the data processing operations. In such as case, the set selected for invoicing is also the set used in the additional processing described below.

At 322, the set selected in 320 is moved to a table in the database. In general, this table includes only the set selected in 320, and no others (e.g., the table excludes the records 310 that are not in the set). The application program (see the application server 214 in FIG. 2 and related description) may instruct the database program (see the database server 216 in FIG. 2 and related description) to move the set to the table in the database. The table may include other information related to the records in the set; for example, the set may be indexed according to the account number associated with each record.

At 324, the table (see 322) is stored for a defined duration. This duration may be set according to various factors. For example, there may be a legal requirement to store the records for a certain amount of time. There may be a contractual arrangement with the customers to store the records for a certain amount of time. The operator of the system 200 (see FIG. 2) may desire to delete records from the database, or to move records from the database to archival storage, after a certain amount of time. The operator of the system 200 (see FIG. 2) may desire to move or delete the records from the database after the associated invoices have been paid. The defined duration may then be selected to account for these time periods, or to account for other criteria.

At 326, the table (see 322) is removed from the database after the defined duration (see 324) has passed. The application program (see the application server 214 in FIG. 2 and related description) may instruct the database program (see the database server 216 in FIG. 2 and related description) to remove the table from the database. The table may be deleted, moved to archival storage, and so forth. If the database program itself includes functionality to move the table to archival storage, then the application program may instruct the database program to do so. Otherwise, the application program may coordinate with other components of the application landscape 100 (see FIG. 1) to move the table from the database to the archival storage. According to an embodiment, the SQL statement DROP TABLE may be used to remove the table.

As the records 310 continue to be generated, other sets may be selected, moved, and removed in a similar manner to that described above (see 320, 322, 324 and 326), as further detailed below.

At 330, for another given time period, a second set of the records are selected from the records 310. In general, this time period immediately follows the preceding time period (see 320) without overlap. For example, if invoices are prepared monthly, then the first time period (see 320) may correspond to January, and the second time period (see 330) may correspond to February. In such a case, there is no duplication of a record in the first set and the second set. According to another example embodiment, the time periods (see 320 and 330) may overlap, in which case there may be duplication of records in the first set and the second set. According to another example embodiment, there may be a gap between the first time period and the second time period, in which case some of the records 310 may not be selected for moving to a table.

At 332, the second set (selected in 330) is moved to a second table in the database. As with the first table (see 322), the second table, in general, excludes any of the records 310 that are not in the second set.

At 334, the second table (see 332) is stored for a defined duration. In general, this defined duration (in 334) has the same length as the first defined duration (in 324). However, the length could also differ. For example, the contractual arrangement with customers may be changed such that the duration is shortened (or lengthened).

At 336, the second table (see 332) is removed from the database after the defined duration (see 334) has passed.

In a similar manner, additional sets of data beyond the two shown and described may be selected, moved to tables, and the tables removed, as the records 310 continue to be generated. According to an example embodiment, the records in the tables may be further arranged according to the account status (e.g., unbilled records, billed records, settled invoices, etc.). In general, these tables may be referred to as "parallel tables" in which the transactional data is divided amongst the tables in a "parallel" manner. Such an arrangement may be contrasted with existing transactional data processing systems that store the transactional data in a single table (e.g., the data is added to the single table for example in a "sequential" or "serial" manner).

The following discussion provides more details of a specific implementation of an invoicing system that implements one or more of the data processing features that were described above. The invoicing system may be referred to as a convergent invoicing system, in that it generates a convergent bill where billing data from various sources is aggregated into a single invoice and is processed together. In general, the convergent invoicing system provides the interface to the account receivables system; handles account receivables charges, discounts and taxes; and support bill data extraction and formatting for print. The convergent invoicing system may be part of another component, such as a contract accounts and receivable and payable (FI-CA) component, that may be part of a larger software system such as an enterprise resource planning financials program (which will be described later in reference to FIG. 4). The convergent invoicing system may include a billing subcomponent and an invoicing subcomponent.

The billing subcomponent processes transactions and additional data from other systems and creates structured bill content. Billing provides a billable item management feature that allows a user to transfer, store and monitor billable items and prepare them for billing execution. The billing subcomponent covers the handling of billable items for the purpose of creating, simulating and reversing billing documents.

The invoicing subcomponent allows a user to create convergent invoices. It merges billing information from a local billing system, and billing systems from other providers, into customer invoices. The invoicing process integrates the billing documents in the invoicing subcomponent. The invoicing subcomponent creates the invoice document that saves the information for the invoice and that is the base for the physical invoice printings and posts the invoice synchronously (although in some embodiments this can also be performed asynchronously). Additionally the invoicing subcomponent may perform the following tasks: (1) Billing documents from different billing systems are selected, grouped, and displayed together on one invoice; (2) Billing documents are transferred to postings documents in the FI-CA component synchronously (the invoice display of the tax amounts can influence the tax to be posted note this process could also be performed asynchronously); (3) simultaneously, correspondence containers are created for invoice printing, and additional data is updated for providing data to a business intelligence system; and (4) current information for the customer account, such as open invoice receivables, can be displaced on the invoice. Further FI-CA business transactions can be integrated in the invoicing processes such that the customer can be informed of changed to the customer account with the invoice. For example, in an invoicing run, a contract account maintenance can be processed by the run. The invoicing run can clear open items of an invoice with credit memo items of a contract account.

In general, invoicing order must exist in order for an invoicing process to be started. These are created when a billing document is created and are used for specific selection of the billing documents not yet processed by an invoicing process. If the invoicing of a billing document is successful, the related invoicing order is deleted.

In addition to billing documents that arise in the local system from the transfer of billing documents from external systems, sales and distribution (SD) billing documents from the SD component and collective bills from the FI-CA component can also be understood as invoiceable billing documents. Special invoicing processes can process these source documents, provided there are invoicing orders of the corresponding source document category.

Parallel processing of the dataset is generally possible. The invoicing processes use the function of the mass activity in FI-CA to split the dataset and distribute processing to different processes in order to reduce the processing time. Parallel processing may also be performed during part or all of the process described in FIG. 3.

The Contract Accounts Receivable and Payable component is a subledger developed for industries with a large number of business partners and a correspondingly high volume of documents to post, such as telecommunications companies. This component provides standard accounts receivable and accounts payable functions including dunning, posting documents, and making payments.

The business processes and functions of the FI-CA component may be integrated with a customer relationship management client, such as the CRM Interaction Center Web Client, by means of a financial customer care component. Example CRM functions include the following: (1) financial customer care (this scenario offers basic functions, such as an account overview, the display of the dunning history, and the search for payments of a customer); and (2) collections management (this scenario covers important processes, such as the initiation of customer calls, processing of payments, and the granting of deferrals and installment plans).

A billable item is created by a business transaction or business event and is an item that is to be billed. A billable item can have different statuses at different points in time. In billing, the system considers only those billable items that have the status "billable." Once these items are successfully processed during billing, the system sets their status to "billed." The various statuses of billable items may be reflected on a technical level using different database tables. According to an embodiment, there is one database table for each combination of status and billable item class. One exception to this rule is the status "billed." For this status, the user can specify how many tables are used, and how they are to be used. As an example, the system 200 allows the system operator to configure up to 100 parallel tables for transactional use.

The upload rule specifies that the system does one of the following with billable items during the transfer: (1) adds them directly to the table of billable items; (2) adds them to the table for raw data; and (3) returns them as having errors.

In relation to the database tables used, the system may differentiate based on the following record types: (1) main items, which represent the actual receivable or payable; and (2) record types dependent on main items, which represent attachments to the main items (for example, credit card payments or taxation information). The main items and the dependent record types may use separate database tables.

The billable item class determines the following technical attributes of a billable item: (1) database tables in which the system saves the billable items, dependent on their status and on the record type they belong to (2) function modules that receive the billable items; (3) function modules that save the billable items to the appropriate database tables; and (4) specific fields of billable items that are added either by customer selection of interface components or using customer fields. For each billable item class, customer-specific checks and data enrichment can be added at various events.

The interface component represents a business process from the viewpoint of billing. The interface component defines which business transactions a billable item class supports (such as deferred revenues and down payment clearings). Interface components are therefore the interface of a billable item class. From a technical perspective, an interface component consists of the documentation of the component, the selection of needed fields, and the specification of dependent/prerequisite interface components, along with checks, derivations, and assignments of field values.

A source transaction is defined by the combination of a source transaction type and source transaction identification. A source transaction represent a group of billable items that belong together from a business viewpoint. According to an embodiment, further processing of billable items may be controlled by the source transaction (that is, by each combination of a source transaction ID and source transaction type). A source transaction can include billable items belonging to different record types.

The billable item type, together with the subprocess, specifies the business significance of an individual billable item. Each item type is assigned to one or more subprocesses.

A subprocess is a self-sufficient processing branch within a billing process for the selection and grouping of billable items and forming a billing document. According to an example embodiment, billable times are immediately assigned to a subprocess when they are created. In such an example embodiment, it is not desirable for the system to process them together with billable items of another subprocess in a common billing document.

The billing process is the superordinate term for the execution of billing according to defined rules. These rules are defined by parameters used to control the billing process. The billing process specifies which subprocesses it supports. For each subprocess, the billing process specifies: (1) which contract accounts are billed; (2) which billable items are selected for billing; and (3) how the billable items are grouped into billing units and, as a consequence, how they are grouped into billing documents.

The selection variant specifies which billable item class the billable items are selected from, and therefore also which billable items are processed in the billing process.

The grouping variant is used for storing the rules for automatic grouping of billable items for processing during billing. The grouping variant determines which billable items are grouped together in one billing unit and controls the link between the billable items and the items of the billing document.

An invoicing process is the superordinate term for the execution of invoicing functions according to defined rules. The invoice process controls: (1) selection of the source documents to be invoiced; (2) summary of source documents to invoicing units; and (3) selection of invoicing functions.

As discussed above, the system 200 may select and move the records to the tables (see 320 and 322 above) as part of other data processing operations. One such data processing operation is the billing process. In general, billing takes place in four individual process steps; data selection, creation of billing units, aggregation of billable items, and updating.

During data selection, the system 200 selects the billable items for the billing process. For example, this selection may also be used as the selection described above at 320. The user may define the selection criteria for the data selection in selection variants for the billing process.

During the creation of billing units, the system 200 groups together the selected billable items into billing units for each contract account. Multiple billing units can be created for each contract account. Billing in Contract Accounts Receivable and Payable creates one billing document for each billing unit. The user may define the criteria that are used to create the billing units in grouping variants for the billing process.

During the aggregation of billable items, the system 200 includes the selected billable items of a billing unit in the billing document. More exactly, the billable items are summarized in billing document items. The individual items that belong to this summarization are linked with the billing document item.

During updating, the system 200 writes the billing document created for the billing unit and the individual billed items to the database, and at the same time deletes the processed billable items.

Figure 4:
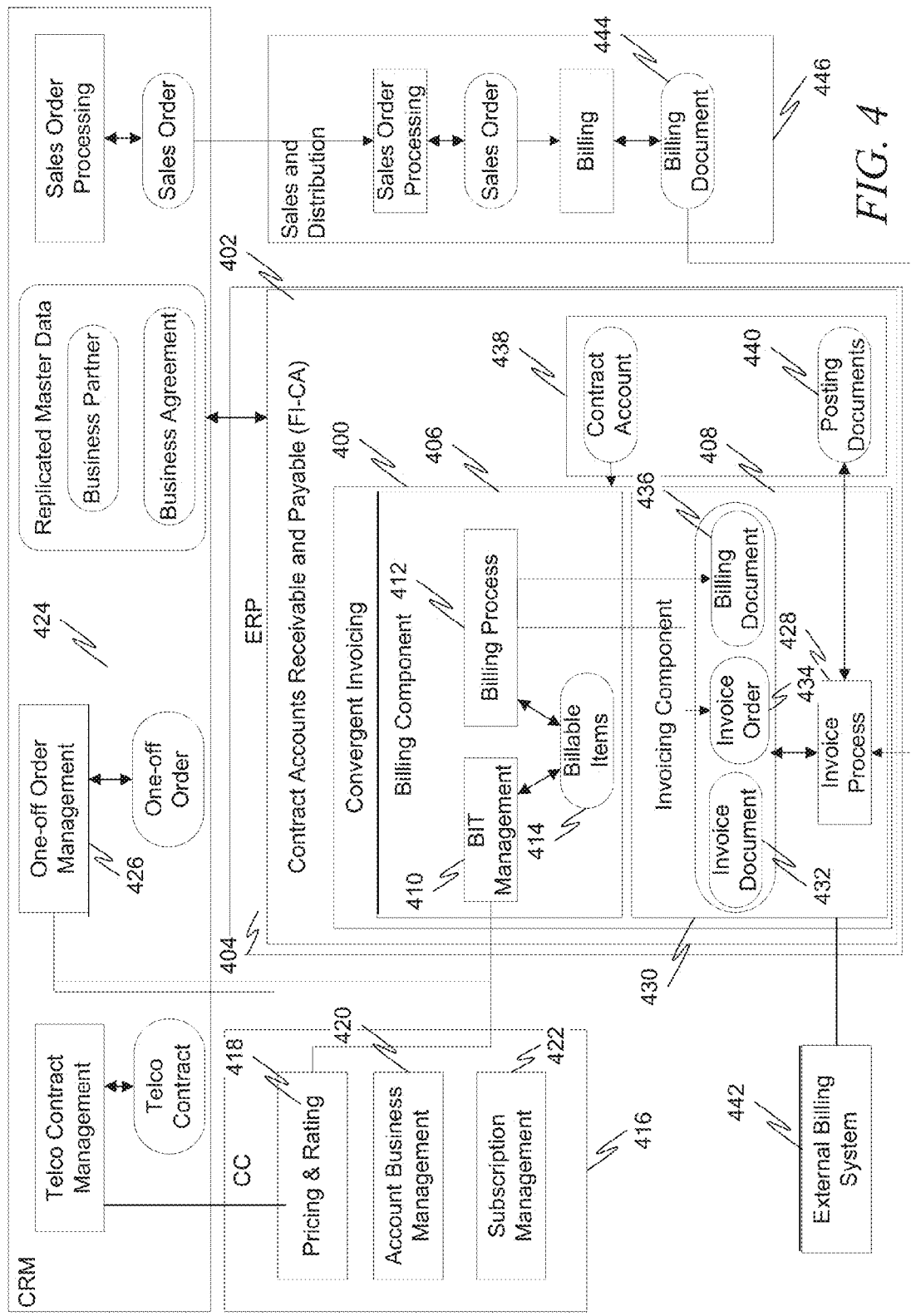
FIG. 4 is an architecture diagram illustrating a convergent invoicing system within an ERP, in accordance with an example embodiment.

FIG. 4 is an architecture diagram illustrating a convergent invoicing system within an ERP, in accordance with an example embodiment. Convergent invoicing system 400 may be run within a FI-CA system 402 within an ERP 404. The convergent invoicing system 400 may include a billing component 406 and an invoicing component 408. The billing component 406 may include a billable item (BIT) management component 410, a billing process 412, and billable items 414. The billable items 414, as described earlier, may be stored in a database. The BIT management component 410 may interface with a convergent charging (CC) component 416. The CC component 416 has the ability to control services and manage balances in real-time. This includes, for example, authenticating a customer and checking the account balance before service delivery to the customer (en example service delivery may be an Internet download). It can also notify users when the account balance threshold set by the operator is reached, or terminate service connectivity when real-time charging indicates that credit has been depleted. This is accomplished using a pricing and rating module 418, an account balance management component 420, and a subscription management component 422.

The BIT management component 410 may also interface with a CRM system 424 and, specifically, the one-off order management component 426 of the CRM system 424.

The invoicing component 408 may include an invoice process 428, as well as invoice data 430, which includes at least one invoice document 432, at least one invoice order 434, and at least one billing document 436. The invoice process 428 may coordinate with a database 438 to post documents 440 and generate the invoice data 430, as well as coordinate with an external billing system 442 to actually send out bills.

The invoice process 428 also interfaces with billing documents 444 generated by a sales and distribution component 446.

It is the billable items 414, invoice documents 432, invoice orders 434, and billing documents 436 that are the focus of one example embodiment. These may be collectively known as "billing and invoicing documents." When an error is found in one of the billing and invoicing documents, it may be necessary for a user to initiate a reversal of the document. Of course, reversal can also occur for reasons other than an error (such as a discount, law change (for example, a change in a tax rate), or implementation of new rules). Nevertheless, currently, such reversals must be performed manually. Specifically, the user must first identify all the documents that contain an error. Then each of the document numbers for the documents must be individually specified in a user interface. These documents must then be reversed immediately. There is no opportunity to have a second set of eyes on the selected documents to be reversed. If one is missed, nobody will notice. Furthermore, even solutions that offer mass reversal still require that the user specify each and every document number, thereby encountering the same problems as described above.

In an example embodiment, the determination of the documents to be reversed and the execution of the reversal task are decoupled. This makes it possible to follow a "4-eye principle," whereby at least one other person reviews the reversal plan prior to being executed.

In another example embodiment, the user establishes a reversal task. The reversal task points to one or more reversal triggers, which each define a reversal that is to occur to a single document in the system. As such, the reversal task embraces the multiple corrections that need to be performed in the system, both to billable items 414 and invoice data 430. An example of a reversal task applying to both billable items 414 and invoice data 430 is the case of reversing a charge for an Internet download. It would not be enough simply to reverse the change to the user's account (in invoice data 430); it is also necessary to reverse the authorization for the download to occur as the billable item 414 will be assigned to the wrong user account.

The system can also automatically add additional reversal triggers for additional documents to a reversal task. For example, the user may specify that the reversal task contains reversal triggers for documents 1-10. The system may know, however, that document 3 is linked to document 11. In such cases, the system will automatically add reversal triggers for these additional documents (document 11 in this example) to the task, even though the user has not expressly requested as much. Furthermore, the system can also cause the rerating of billable items 414 or invoice data 430. Rerating occurs when it is necessary for the CC component 416 to resend the data used to create the billable item 414 or invoice data 430. In an example embodiment, the system augments the reversal task to include instructions to the CC component 416 to do just that, if necessary.

Figure 5:
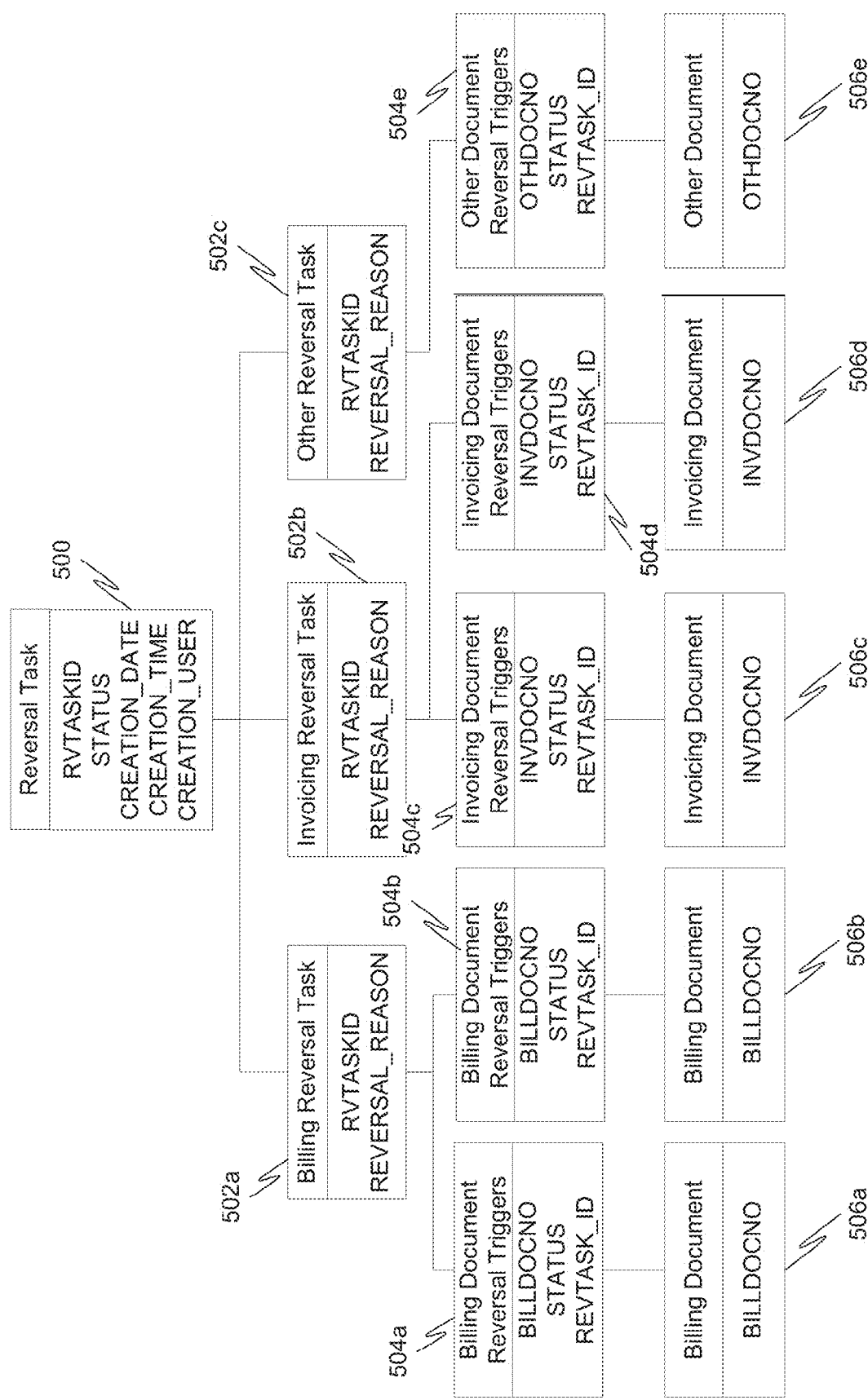
FIG. 5 is a block diagram illustrating a reversal task, in accordance with an example embodiment.

FIG. 5 is a block diagram illustrating a reversal task, in accordance with an example embodiment. As can be seen, the reversal task 500 is linked to a number of classes of reversal tasks 502a-502c. Each class of reversal tasks 502a-502c corresponds to a different type of reversal task. Depicted here are a billing reversal task 502a, an invoicing reversal task 502b, and an "other" reversal task 502c. These classes of reversal tasks 502a-502c provide for a field for a reason of reversal to be identified. The reason these classes are separated is to allow the user to enter, for example, a different reason for the billing reversals than for the invoicing reversals. Each of these classes of reversal tasks 502a-502c may be linked to one or more reversal triggers 504a-504e, each corresponding to a billing document 506a-506e. Billing documents 506a-506b may be located in the billing module 406, and invoicing documents 506c-506d may be located in the invoicing component 408. Other billing documents 506e may be located in other modules.

Once the reversal task is executed and particular reversal triggers have run, the corresponding reversal triggers can be deleted. The system may leave the reversal task in place in case the user wished to add future reversal triggers to the reversal task.

It is also possible for a reversal trigger to exist without a linked reversal task. Such independent triggers can simply be executed and deleted.

FIG. 6 is a diagram illustrating a reversal task administrative record, in accordance with an example embodiment. As can be seen, this record includes a number of fields. Most importantly, the record 600 includes a description 602 of the reversal task and a status 604 of the reversal task. The possible states for the status 604 include open (cannot be processed yet, i.e., still a work-in-progress), released, aborted, finished, and rejected. Other states may be possible in various implementations.

FIG. 7 is a diagram illustrating a reversal task billing record, in accordance with an example embodiment. As can be seen, this record includes a number of fields. Most importantly, the record 700 includes an identification 702 of a corresponding reversal task and a reason for reversal 704. The record 700 may also contain a total 706 of the number of reversal triggers corresponding to this reverse task billing record 700. This can be useful in resource planning for the eventual execution of the reversal triggers.

FIG. 8 is a diagram illustrating a reversal task invoicing record, in accordance with an example embodiment. As can be seen, this record includes a number of fields. Most importantly, the record 800 includes an identification 802 of a corresponding reversal task and a reason for reversal 804. The record 800 may also contain a total 806 of the number of reversal triggers corresponding to this reverse task invoicing record 800. This can be useful in resource planning for the eventual execution of the reversal triggers.

FIG. 9 is a diagram illustrating a billing reversal trigger record, in accordance with an example embodiment. As can be seen, this record includes a number of fields. Most importantly, the record 900 includes a billing document number 902, which uniquely identifies the billing document corresponding to this reversal trigger. The record 900 also includes an identification 904 of the reversal task to which this reversal trigger corresponds.

Figure 10:
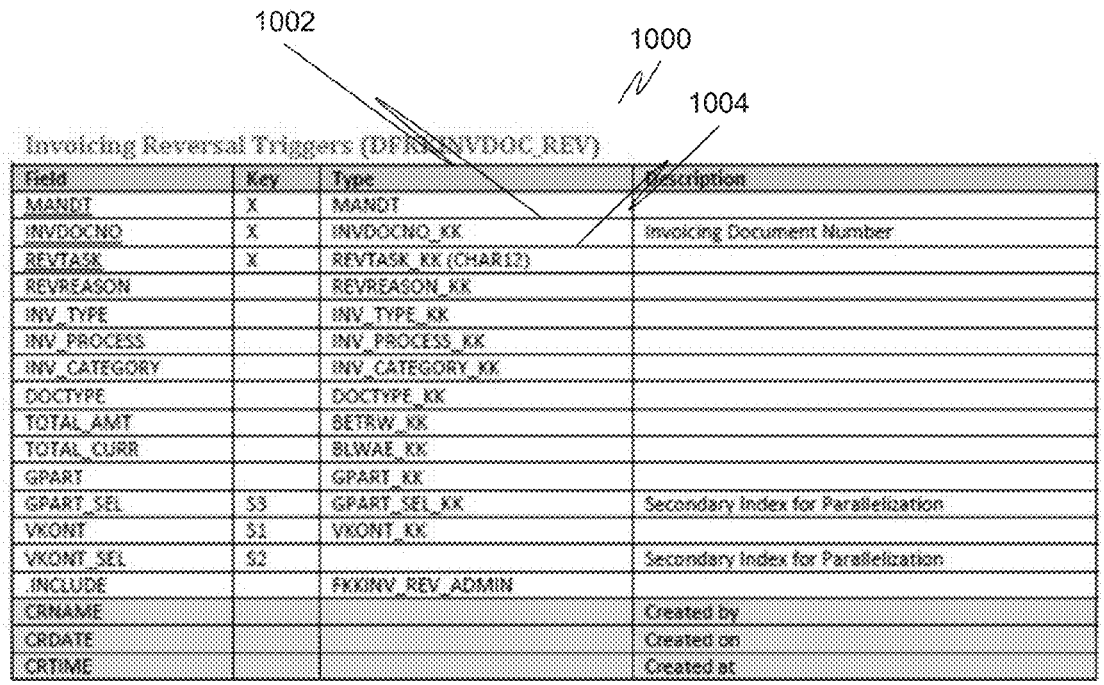
FIG. 10 is a diagram illustrating an invoicing reversal trigger record, in accordance with an example embodiment.

FIG. 10 is a diagram illustrating an invoicing reversal trigger record, in accordance with an example embodiment. As can be seen, this record includes a number of fields. Most importantly, the record 1000 includes an invoicing document number 1002, which uniquely identifies the invoicing document corresponding to this reversal trigger. The record 1000 also includes an identification 1004 of the reversal task to which this reversal trigger corresponds.

Figure 11:
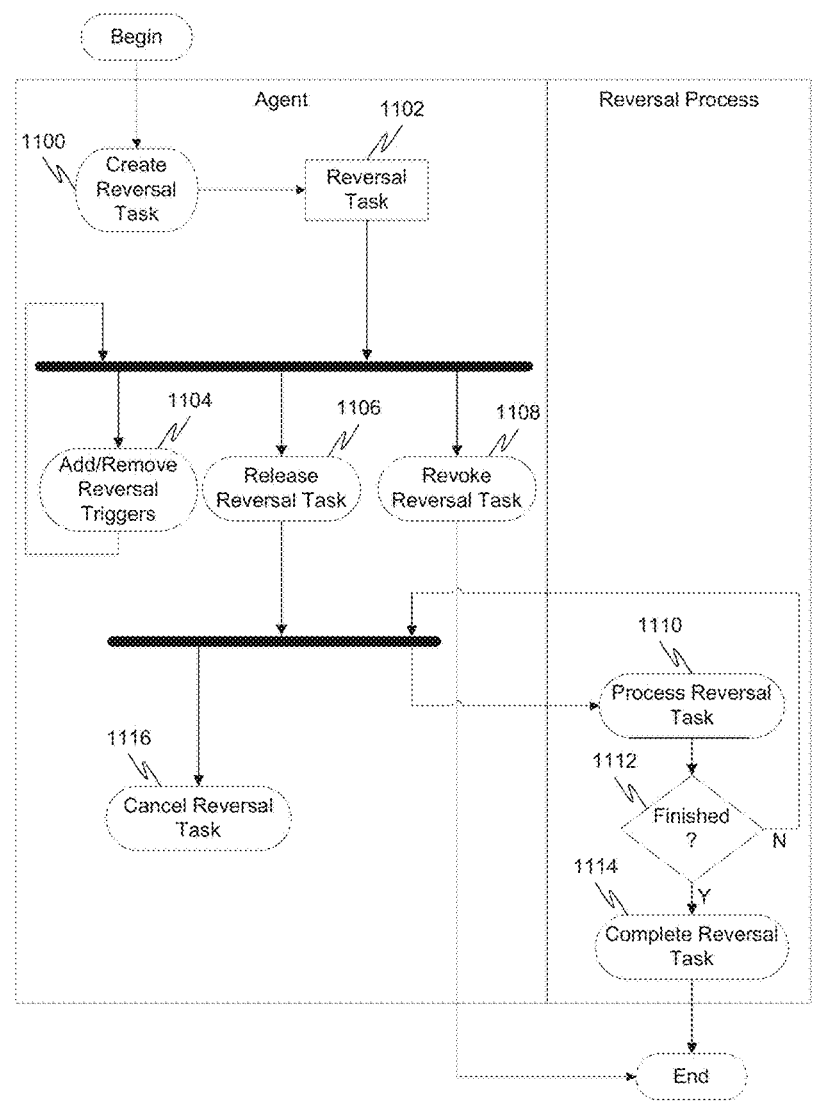
FIG. 11 is a diagram illustrating a process flow for operating a reversal task, in accordance with an example embodiment.

FIG. 11 is a diagram illustrating a process flow for operating a reversal task, in accordance with an example embodiment. At 1100, the reversal task is created. This reversal task is then depicted as 1102. Once this task is created, reversal triggers can be added or removed at 1104. This may continue to loop until the reversal task is released at 1106 or revoked at 1108. While releasing the reversal task is depicted as being performed by an agent, in reality a different entity may perform the releasing than created the task/triggers. In one example embodiment, while a user may create the task and triggers, a supervisor actually performs the releasing of the reversal tasks. Once the reversal task is released, the reversal task may be processed at 1110. This may involve processing all the reversal triggers in the reversal task. At 1112, it is determined if the process has completed. If so, then at 1114 the reversal task is complete. At any point, the user can cancel the reversal task at 1116, which also ends the process.

Figure 12:
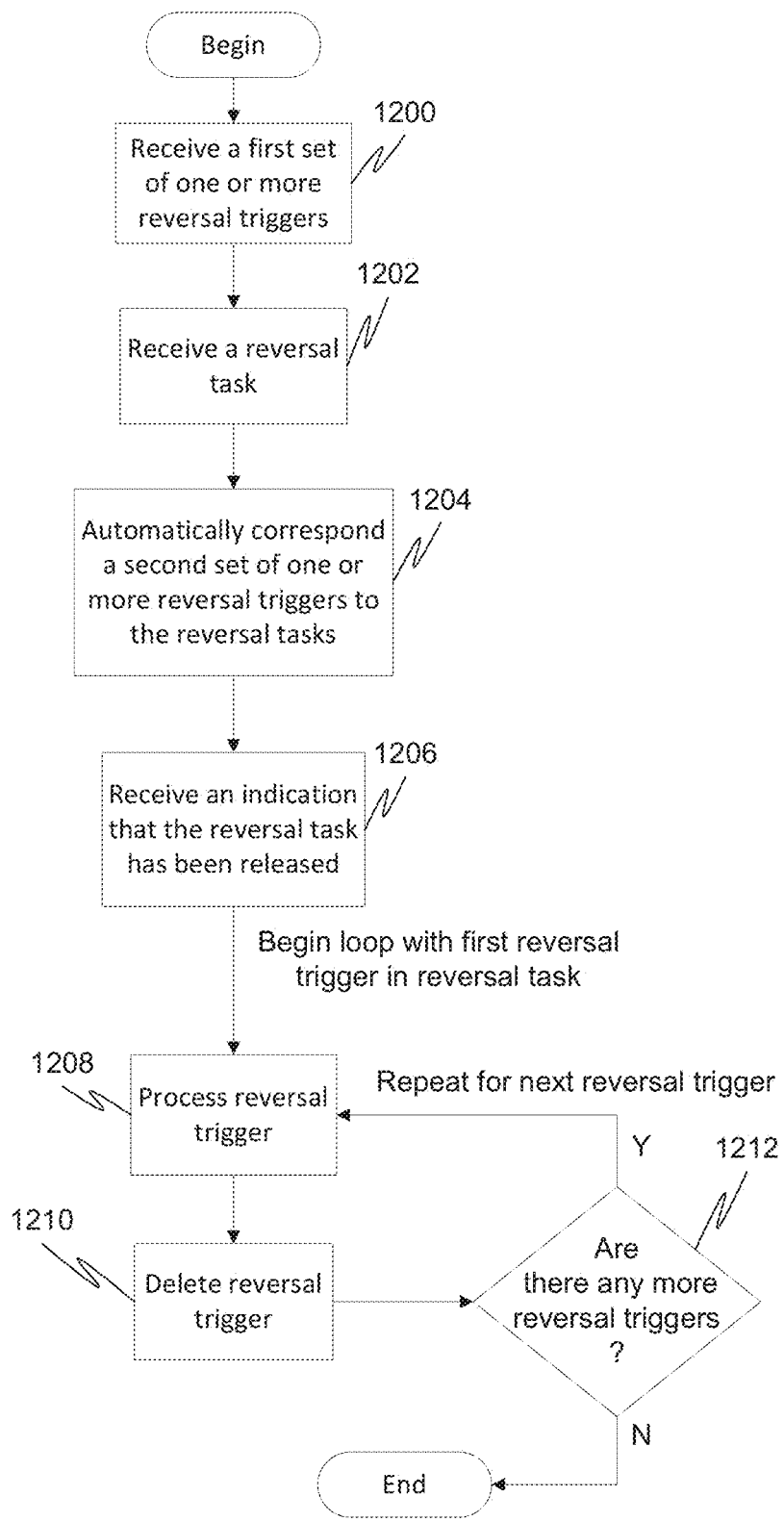
FIG. 12 is a flow diagram illustrating a method of reversing documents in a convergent invoicing system, in accordance with an example embodiment.

FIG. 12 is a flow diagram illustrating a method of reversing documents in a convergent invoicing system, in accordance with an example embodiment. At 1200, a first set of one or more reversal triggers is received, wherein each of the one or more task triggers corresponds to a document in the convergent invoicing system. It should be noted that even though this act is described as receiving a set, the individual reversal triggers in the set can, in one example embodiment, be received one at a time. There is no necessity that they all be received at the same time. At 1202, a reversal task is received, wherein the reversal task corresponds to the first set of one or more reversal triggers.

At 1204, a second set of reversal triggers is automatically corresponded to the reversal task, based upon documents corresponding to the one or more task triggers in the first set of one or more reversal triggers. At 1206, an indication that the reversal task has been released is received. It should be noted that 1200, 1202, and 1206 all describe acts where items are received. These items can be received by different users for different steps. For example, a first user can provide the items in 1200 and 1202 and a second user, perhaps the first user's supervisor, can provide the indication in 1206.

In response to the indication that the reversal task has been released, a loop may be started for each reversal trigger corresponding to the reversal task. In this loop, at 1208, the reversal trigger is processed, causing a corresponding document to be reversed. At 1210, the reversal trigger can be deleted. Then, at 1212, it is determined if there are any more reversal triggers exist for this reversal task. If so, then the process loops to 1208. Otherwise, the process ends.

Figure 13:
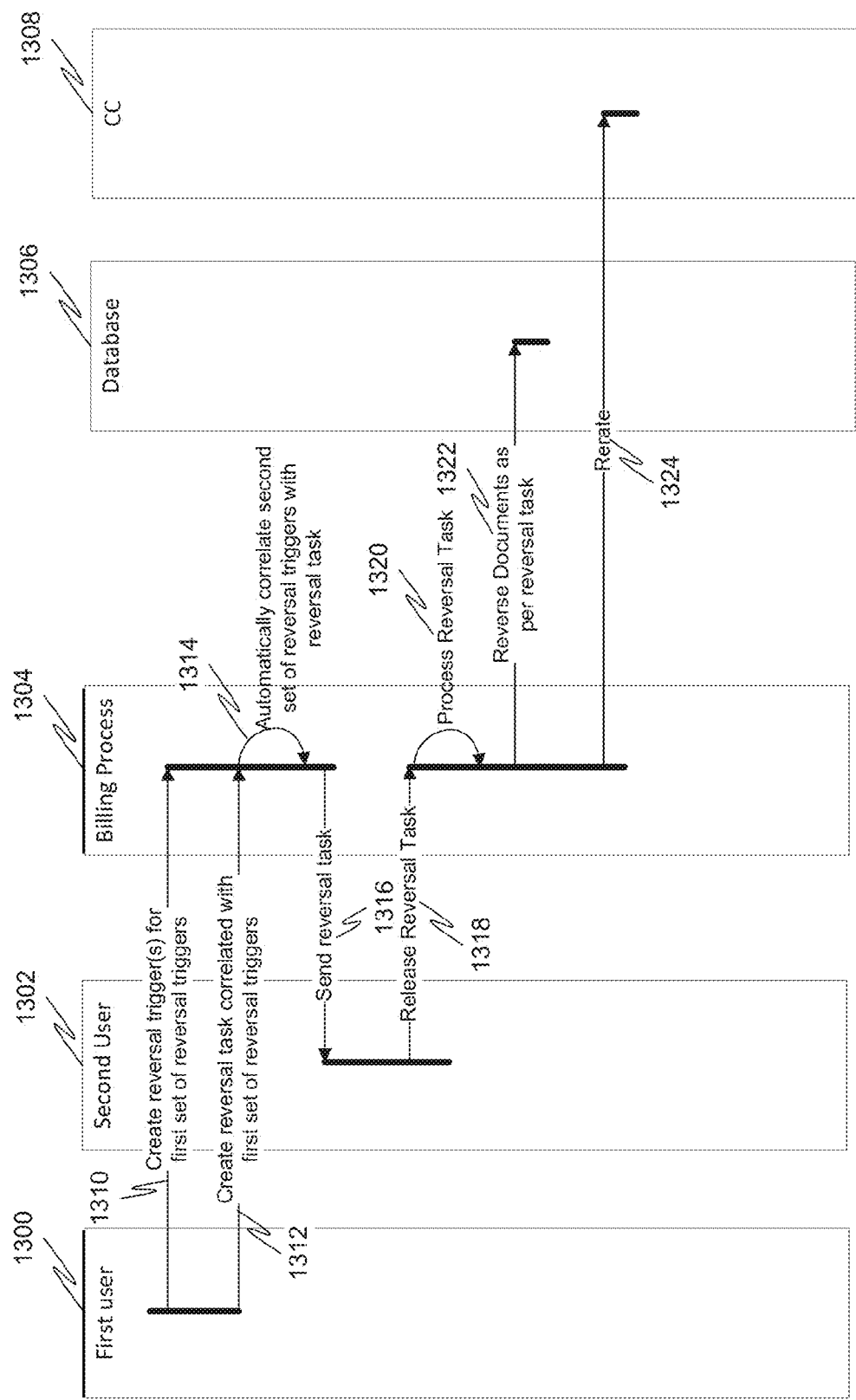
FIG. 13 is an interaction diagram illustrating a method of reversing documents in a convergent invoicing system, in accordance with an example embodiment.

FIG. 13 is an interaction diagram illustrating a method of reversing documents in a convergent invoicing system, in accordance with an example embodiment. Components in this diagram include a first user 1300, a second user 1302, a billing process 1304, a database 1306, and a CC component 1308. At 1310, the first user 1300 creates reversal triggers for a first set of reversal triggers. These are created in the billing process 1304. At 1312, the first user 1300 creates a reversal task correlated with the first set of reversal triggers. Again these are created in the billing process 1304. At 1314, the billing process 1304 automatically correlates a second set of reversal triggers with the reversal task. At 1316, the reversal task is sent to a second user 1302 for approval. This second user may be, for example, a supervisor. At 1318, the second user 1302 releases the reversal task. At 1320, the billing process 1304 processes the reversal task 1320. This may involve reversing documents at 1322 as per the reversal task (more particularly as per the reversal triggers in the reversal task), or rerating consumption records in the CC component 1308 at 1324.

Figure 14:
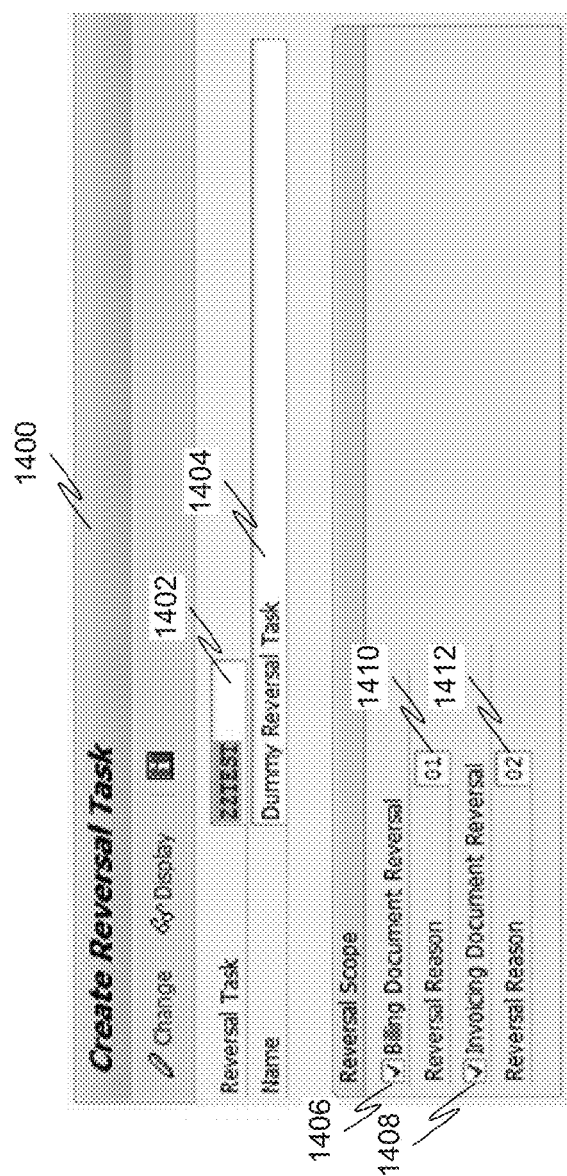
FIG. 14 is a diagram illustrating a screen capture of a reversal task creation screen in accordance with an example embodiment.
Figure 15:
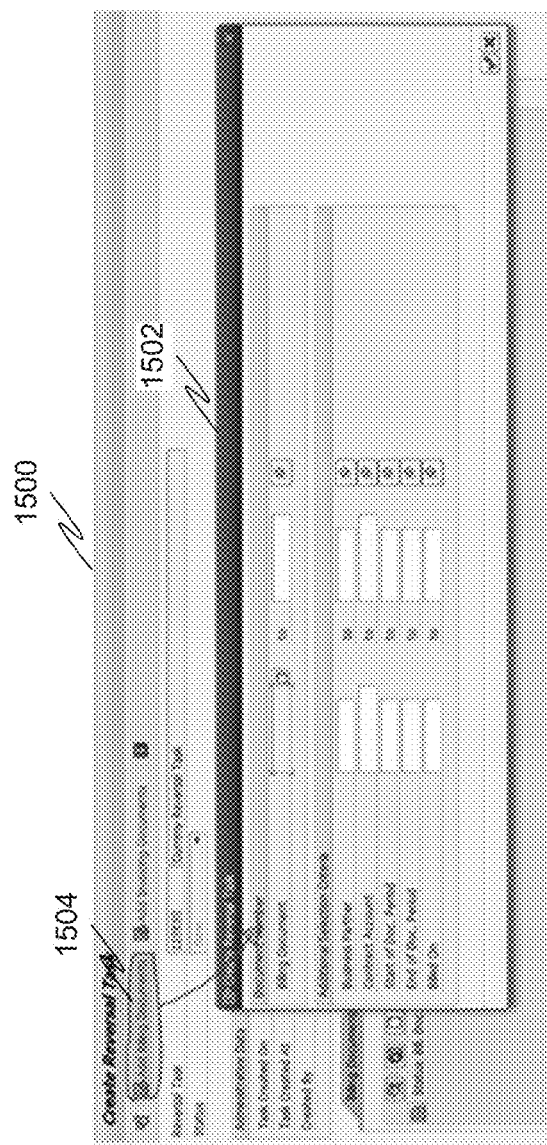
FIG. 15 is a diagram illustrating a screen capture of a billing document entry screen in accordance with an example embodiment.
Figure 16:
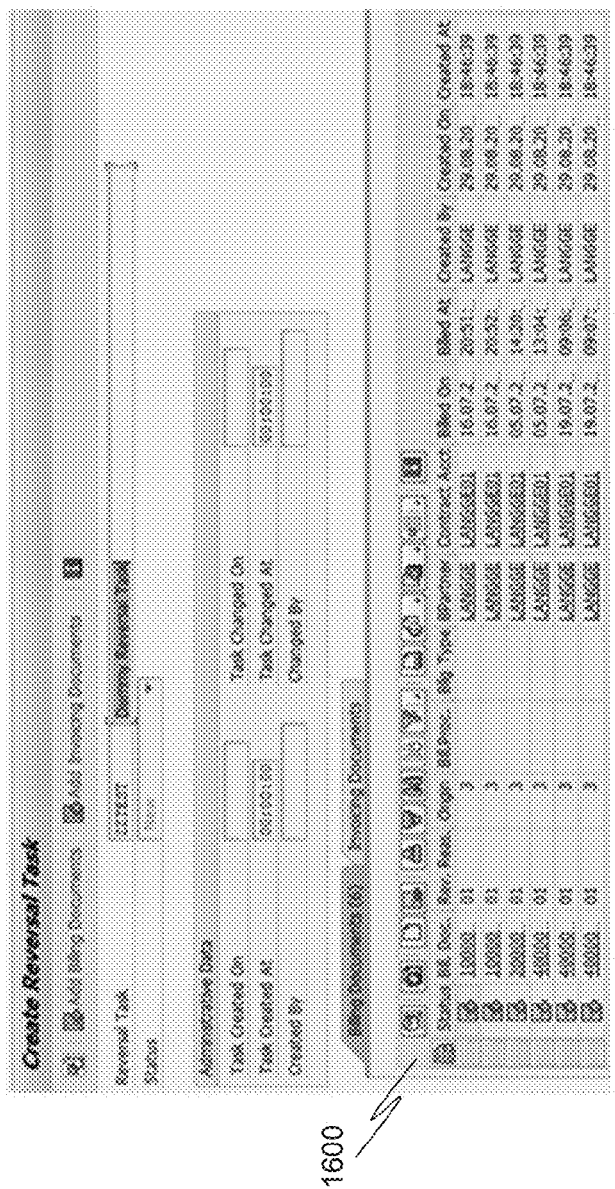
FIG. 16 is a diagram illustrating a screen capture of a document list for a reversal task in accordance with an example embodiment.

FIGS. 14-16 are diagrams depicting screen captures in accordance with an example embodiment. Referring first to FIG. 14, a screen 1400 is presented where a user can created a reversal task, including an identification 1402 of the task, a name 1404 for the task, as well as selecting whether billing 1406 and/or invoicing 1408 documents are to be reversed, and reversal reasons 1410, 1412 for each.

Once the user has created the task, the user may select to add billing and/or invoicing documents. Referring to FIG. 15, a screen 1500 is presented including a window 1502 for entering billing documents, when the user selected on an "add billing documents" button 1504. When the user has added documents, the documents may show up in a documents list 1600 depicted in FIG. 16.

Figure 17:
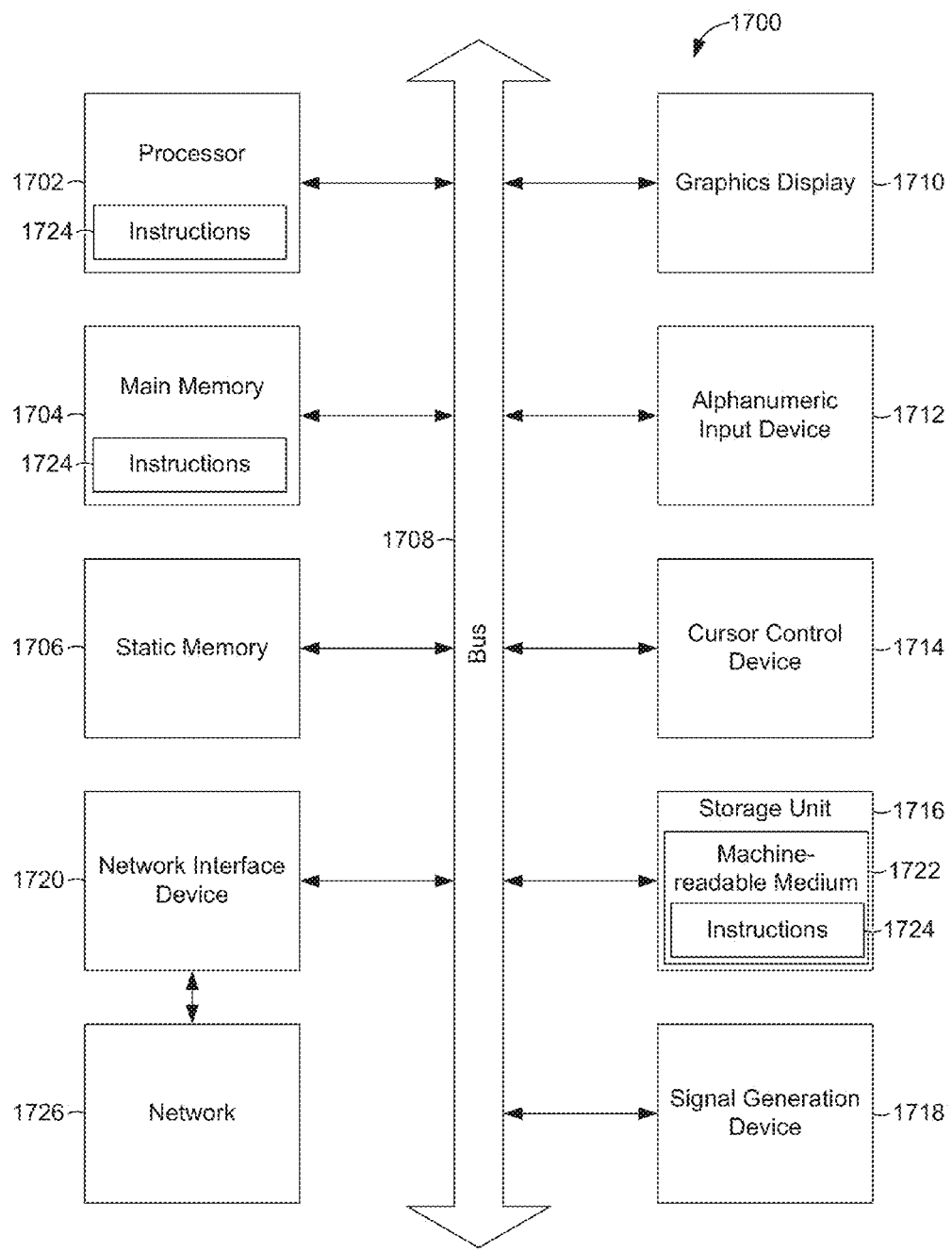
FIG. 17 is a block diagram of a computer processing system at a server system, within which a set of instructions, for causing the computer to perform any one or more of the methodologies discussed herein, may be executed.

FIG. 17 is a block diagram of a computer processing system at a server system, within which a set of instructions, for causing the computer to perform any one or more of the methodologies discussed herein, may be executed.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a personal digital assistant (PDA), cellular telephone, or nay processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1700 includes processor 1702 (e.g., a central processing unit (CPU), a graphics processing unit (GPU) or both), main memory 1704 and static memory 1706, which communicate with each other via bus 1708. The processing system 1700 may further include graphics display unit 1710 (e.g., a plasma display, a liquid crystal display (LCD), or a cathode ray tube (CRT)). The processing system 1700 also includes alphanumeric input device 1712 (e.g., a keyboard), a cursor control device (UI) navigation device 1714 (e.g., a mouse, touch screen, or the like), a disk drive unit 1716, a signal generation device 1718 (e.g., a speaker), and a network interface device 1720.

The disk drive unit 1716 includes computer-readable medium 1722 on which is stored one or more sets of instructions and data structures (e.g., software 1724) embodying or utilized by any one or more of the methodologies or functions described herein. The software 1724 may also reside, completely or at least partially, within the main memory 1704 and/or within the processor 1702 during execution thereof by the processing system 1700, with the main memory 1704 and the processor 1702 also constituting computer-readable, tangible media.

The software 1724 may further be transmitted or received over network 1726 via a network interface device 1720 utilizing any one of a number of well-known transfer protocols (e.g., Hypertext Transfer Protocol (HTTP)).

While the computer-readable medium 1722 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "computer-readable medium" shall accordingly be taken to include, but not be limited to, solid-state memories, and optical and magnetic media.

While various implementations and exploitations are described, it will be understood that these embodiments are illustrative, and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

The term "computer readable medium" is used generally to refer to media such as main memory, secondary memory, removable storage, hard disks, flash memory, disk drive memory, CD-ROM and other forms of persistent memory. It should be noted that program storage devices, as may be used to describe storage devices containing executable computer code for operating various methods, shall not be construed to cover transitory subject matter, such as carrier waves or signals. Program storage devices and computer readable medium are terms used generally to refer to media such as main memory, secondary memory, removable storage disks, hard disk drives, and other tangible storage devices or components.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of reversing documents in a convergent invoicing system, the method comprising:
   creating a reversal task related to an error discovered in at least one invoicing document in the convergent invoicing system;
   adding, using a computer processor, a first set of one or more reversal triggers to the reversal task, wherein the reversal task links to the first set of one or more reversal triggers, each of the one or more reversal triggers identifying a reversal that is to occur to a corresponding document of a first set of documents in the convergent invoicing system, wherein each reversal trigger is requested to be performed by a user;
   automatically adding, using a computer processor, a second set of reversal triggers to the reversal task, causing the reversal task to link to the second set of reversal triggers, each of the reversal triggers of the second set of reversal triggers identifying a reversal that is to occur to an additional document that is related to at least one of the first set of documents, wherein each reversal trigger in the second set of reversal triggers is not expressly requested by the user;
   receiving an indication that the reversal task has been released;
   in response to the indication that the reversal task has been released, for each reversal trigger corresponding to the reversal task;
      processing the reversal trigger, causing a corresponding document linked to the reversal trigger to be reversed; and
      deleting the reversal trigger.

2. The method of claim 1, wherein the first set of one or more reversal triggers includes at least one billing document and at least one invoicing document.

3. The method of claim 1, wherein the receiving a first set of one or more reversal triggers and the receiving a reversal task are received from a first user, and the receiving an indication that the reversal task has been released is received from a second user different than the first user.

4. The method of claim 1, wherein the reversal task is defined by a reversal task administrative record including a description of the reversal task and a status of the reversal task.

5. The method of claim 4, wherein the indication that the reversal task has been released is a change in the status in the reversal task administrative record to a released state.

6. The method of claim 4, wherein the status in the reversal task administrative record indicates whether the reversal task is open, released, aborted, finished, or rejected.

7. The method of claim 1, wherein at least one of the reversal triggers causes a document to be rerated when processed, wherein rerating involves requesting a convergent charging component to resend data.

8. A non-transitory computer-readable storage medium comprising instructions that, when executed by at least one processor of a machine, cause the machine to perform operations of reversing documents in a convergent invoicing system, comprising:
creating a reversal task related to an error discovered in at least one invoicing document in the convergent invoicing system;
adding, using a computer processor, a first set of one or more reversal triggers to the reversal task, wherein the reversal task links to the first set of one or more reversal triggers, each of the one or more reversal triggers identifying a reversal that is to occur to a corresponding document of a first set of documents in the convergent invoicing system, wherein each reversal trigger is requested to be performed by a user;
automatically adding, using a computer processor, a second set of reversal triggers to the reversal task, causing the reversal task to link to the second set of reversal triggers, each of the reversal triggers of the second set of reversal triggers identifying a reversal that is to occur to an additional document that is related to at least one of the first set of documents, wherein each reversal trigger in the second set of reversal triggers is not expressly requested by the user;
receiving an indication that the reversal task has been released;
in response to the indication that the reversal task has been released, for each reversal trigger corresponding to the reversal task;
processing the reversal trigger, causing a corresponding document linked to the reversal trigger to be reversed; and
deleting the reversal trigger.

9. The non-transitory computer-readable storage medium of claim 8, wherein the first set of one or more reversal triggers includes at least one billing document and at least one invoicing document.

10. The non-transitory computer-readable storage medium of claim 8, wherein the receiving a first set of one or more reversal triggers and the receiving a reversal task are received from a first user, and the receiving an indication that the reversal task has been released is received from a second user different than the first user.

11. The non-transitory computer-readable storage medium of claim 8, wherein the reversal task is defined by a reversal task administrative record including a description of the reversal task and a status of the reversal task.

12. The non-transitory computer-readable storage medium of claim 11, wherein the indication that the reversal task has been released is a change in the status in the reversal task administrative record to a released state.

13. The non-transitory computer-readable storage medium of claim 11, wherein the status in the reversal task administrative record indicates whether the reversal task is open, released, aborted, finished, or rejected.

14. The non-transitory computer-readable storage medium of claim 8, wherein at least one of the reversal triggers causes a document to be rerated when processed, wherein rerating involves requesting a convergent charging component to resend data.

* * * * *